Patented Oct. 5, 1954

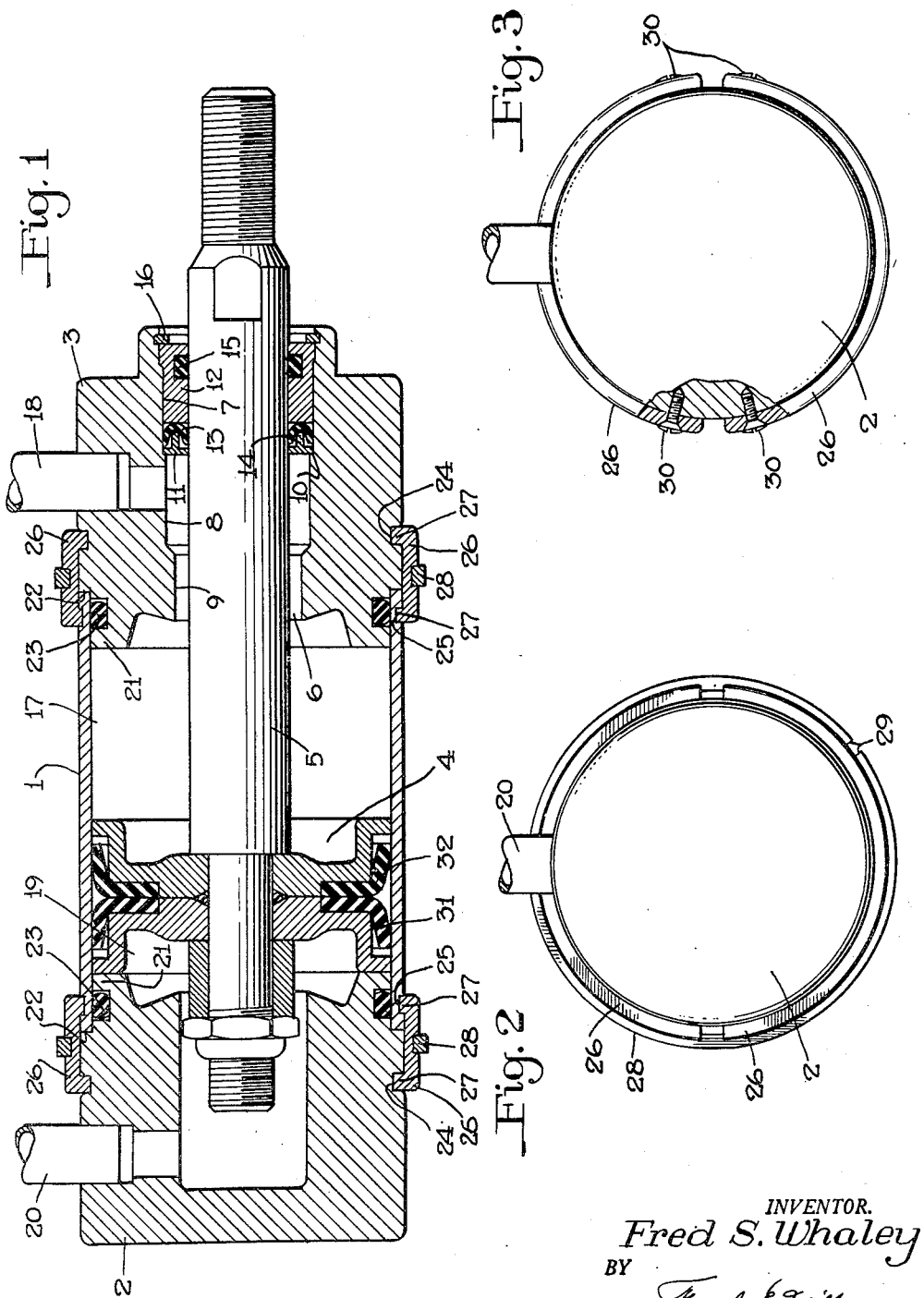

2,690,939

UNITED STATES PATENT OFFICE 2,690,939

FLUID PRESSURE CYLINDER

Fred S. Whaley, Greensburg, Pa., assignor to Westinghouse Air Brake Company, a corporation of Pennsylvania Application December 20, 1950, Serial No. 201,812

2 Claims. (Cl. 309—2)

This invention relates to fluid pressure cylinders of the type comprising a body having removable heads and containing a piston arranged to be operated by fluid under pressure to operate a part of a machine or the like.

The principal object of the invention is the provision of a cylinder of the above type having improved means for removably securing the head or heads to the cylinder body.

Other objects and advantages of the invention will become apparent from the following more detailed description thereof.

In the accompanying drawing; Fig. 1 is a longitudinal, sectional view of a fluid pressure cylinder constructed in accordance with one embodiment of the invention; Fig. 2 is a left-hand view of said cylinder; and Fig. 3 is a view similar to Fig. 2, but of a modified form of the invention.

As shown in the drawing, 1 designates a cylindrical body which may be made of any desired length and diameter. The cylinder body 1 may be formed in any desired manner but is preferable cut to desired length from standard, commercial tubing of diameter which will insure a desired output of power of the cylinder as a whole. The opposite ends of body 1 are closed by circular heads 2 and 3, respectively, and slidably mounted in said body is a piston 4 having a rod 5 extending through an axially arranged opening 6 in the head 3 for connection with a device to be controlled.

The opening 6 is preferably formed at three different diameters 7, 8 and 9, respectively, all larger than the diameter of rod 5 and with the bore 7 of greatest diameter open to the outer end of head 3, a shoulder 10 being formed at the junction of the two bores 7 and 8. Slidably mounted on rod 5 within the bore 7 are a ring 11 and a rod bearing 12, said ring engaging the shoulder 10. Between the ring 11 and adjacent end of bearing 12 there is an annular U-shaped packing ring 13 arranged with its base against the bearing 12 and the outer surfaces of the outer of the two legs in sealing contact with the wall of bore 7 and the outer surface of the other leg in sealing and sliding contact with the peripherial surface of rod 5. A rib 14 on ring 11 projects between the two legs of packing ring 13 to prevent collapse of the legs thereof. The bearing 12 has an annular groove open to the surface of rod 5 and containing an annular resilient packing ring 15 having sealing and sliding contact with the rod 5. A ring 16 expanded into a groove in head 3 engages the outer surface of bearing 12 to hold same and thereby the packing 13 and ring 11 in position.

The opening 6 connects a pressure chamber 17 at one side of piston 4 to a pipe 18 in head 3. A pressure chamber 19 at the opposite side of piston 4 is open to a pipe 20 in the pressure head 2. It will be noted that the cylinder employed for illustration is double acting the piston 4 comprising two oppositely arranged packing cups 31, 32, the outer edges which are resiliently pressed against the inner wall of body 1 to prevent leakage of fluid under pressure from one side of the piston to the opposite side.

Except for the structure above described the two heads 2 and 3 are identical, each comprising a cylindrical inner end portion 21 terminating at a shoulder 22 and adapted to be slipped into the respective end of the body 1 until said shoulder engages the end of said body. In the end portion 21 of each head 2, 3, there is provided an annular groove containing an annular, resilient ring 23 providing a seal between the head and body to prevent leakage of fluid under pressure from the respective chamber 17 or 19.

Each head 2, 3 has an annular groove 24 open to the peripheral surface thereof a chosen distance from the respective shoulder 22 and in the adjacent end of body 1 is a parallel arranged annular groove 25 open to the outer surface thereof and spaced back a chosen distance from the end engaging shoulder 22. A plurality, preferably two, of ring segments 26 are arranged in end to end relation around the abutting ends of each head and the body 1, each segment having two inwardly extending ribs 27, one at either edge and therefore parallel arranged, adapted to be disposed in the grooves 24 and 25 of the respective head and adjacent end of body 1, the side walls of said ribs and grooves being preferably at right angles to the axis of the cylinder 1 for locking the head to the adjacent end of the body 1. Encircling and tensioned around each pair of end to end arranged segments 26 is an open ended clamping ring 28 for holding said segments secured against the outer surface of the respective head and adjacent end of body 1. To prevent the ring 28 from being accidentally knocked off the respective segments 26 it is preferably of square cross-section and contracted into a similarly shaped groove provided in said segments and open to the outer surface thereof.

In order to remove a head 2 or 3 from the body 1 a tool will be placed between the two ends 29 of ring 28 and said ring will then be expanded to clear the segments 26 and then be removed from around said segments. The segments 26 will then be removed following which the head 2 or 3 will be pulled from the respective end of the body 1. To apply a head 2 or 3 the procedure just described will be reversed.

Instead of using ring 28 to hold the segments 26 in place, said segments may be secured to head 2 or 3 by a screw 30 near each of the opposite ends of each segment having screw-threaded engagement with the respective head, as shown in Fig. 3.

It will now be seen that I have provided a simple, inexpensive compact, fluid pressure cylinder adapted to be made up in any desired length from commercial tubing to which pressure heads 2 and 3 may be readily applied and removed, as desired. After the tubing is cut to the desired length it need only be provided with the external grooves 25 near its opposite ends and then assembled to heads 2 and 3 as above described to provide a complete structure. It will be noted that the interior surface of the body 1 is smooth throughout its length to permit ready removal of piston 4 without destruction of the packing cups 31 and 32. The heads 2 and 3 may be turned relative to each other and to the body 1 to accommodate disposition or location of pipes 18, 20.

Having now described my invention, what I claim as new and desire to secure by Letters Patent, is:

1. A fluid pressure cylinder comprising a cylindrical body having a smooth unbroken piston bore open to one end of said body, a pressure head comprising a cylindrical portion slidably mounted in the open end of said bore into abutting engagement with said end of said body, said body and head each having at the respective side of abutting engagement an annular groove extending circumferentially thereof and open to the exterior surface thereof, two oppositely arranged removable substantially semi-circular elements arranged around said cylinder over the abutting joint between said body and head and each comprising at its opposite edges two parallel arranged ribs extending radially inward and disposed respectively in said grooves for securing said head and body together, and a removable split ring encircling said elements under tension urging said elements into locking relation with said body and head.

2. A fluid pressure power cylinder comprising a tubular element having, from end to end, parallel inner and outer walls, said inner wall constituting a smooth and unbroken piston bore, a pressure head of the same diameter as the outside diameter of said tubular element mounted against one end of said element and comprising a coaxially arranged cylindrical portion slidably disposed within said element, said cylindrical portion having an annular recess open to the peripheral surface thereof, an annular, resilient ring disposed in said recess in sealing engagement with the inner wall of said element and a wall of said recess, said element and pressure head each having a circumferential groove spaced from the joint therebetween and open to the outer peripheral surface thereof, a pair of substantially semi-circular elements arranged in substantial end to end relation around said cylinder over said joint and each comprising two axially spaced apart, radially inward directed ribs, one disposed in the said groove at each side of said joint, and removable means securing said pair of elements to said tubular element and pressure head.

References Cited in the file of this patent

UNITED STATES PATENTS

| Number | Name | Date |
|---|---|---|
| 1,283,091 | Crawford | Oct. 29, 1918 |
| 1,668,822 | Schlacks | May 8, 1928 |
| 2,387,410 | Roe | Oct. 23, 1945 |
| 2,401,378 | Smith | June 4, 1946 |
| 2,451,089 | Hunter | Oct. 12, 1948 |
| 2,486,120 | Colton | Oct. 25, 1949 |

FOREIGN PATENTS

| Number | Country | Date |
|---|---|---|
| 321,489 | Italy | Oct. 6, 1934 |